United States Patent
Lam

(10) Patent No.: US 10,917,361 B2
(45) Date of Patent: Feb. 9, 2021

(54) DATA PROCESSING APPARATUS AND TERMINAL

(71) Applicant: Huawei Technologies Co., Ltd., Shenzhen (CN)

(72) Inventor: Wan Lam, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/907,993

(22) Filed: Feb. 28, 2018

(65) Prior Publication Data

US 2018/0248816 A1   Aug. 30, 2018

(30) Foreign Application Priority Data

Feb. 28, 2017   (CN) .......................... 2017 1 0112079

(51) Int. Cl.
  *G06F 13/00*   (2006.01)
  *H04L 12/933*   (2013.01)
  (Continued)

(52) U.S. Cl.
  CPC ............ *H04L 49/101* (2013.01); *G06F 13/16* (2013.01); *H04L 12/40006* (2013.01);
  (Continued)

(58) Field of Classification Search
  None
  See application file for complete search history.

(56) References Cited

U.S. PATENT DOCUMENTS

2002/0061030 A1*   5/2002   Iny ........................ H04L 49/254
                                                            370/449
2002/0152420 A1*   10/2002   Chaudhry ........... G06F 11/1641
                                                            714/11

(Continued)

FOREIGN PATENT DOCUMENTS

CN         1679281 A        10/2005
CN       201726481 U         1/2011
(Continued)

OTHER PUBLICATIONS

Machine Translation and Abstract of Chinese Publication No. CN201726481, Jan. 26, 2011, 12 pages.
(Continued)

*Primary Examiner* — Henry Tsai
*Assistant Examiner* — Dean Phan
(74) *Attorney, Agent, or Firm* — Conley Rose, P.C.

(57) ABSTRACT

A data processing apparatus includes N apparatus input ends, an input switch, K buffer areas, a first output switch, a second output switch, and M apparatus output ends. N input ends of the input switch are coupled to the N apparatus input ends, and K output ends of the input switch correspond to the K buffer areas. $K_1$ input ends of the first output switch correspond to $K_1$ buffer areas in the K buffer areas, and M output ends of the first output switch are coupled to the M apparatus output ends. $K_2$ input ends of the second output switch correspond to $K_2$ buffer areas in the K buffer areas except the $K_1$ buffer areas, and M output ends of the second output switch are coupled to the M apparatus output ends.

20 Claims, 6 Drawing Sheets

(51) Int. Cl.
  *H04L 12/40* (2006.01)
  *G06F 13/16* (2006.01)
  *H04L 12/937* (2013.01)
  *H04L 12/931* (2013.01)

(52) U.S. Cl.
  CPC ............ *H04L 49/10* (2013.01); *H04L 49/103* (2013.01); *H04L 49/1507* (2013.01); *H04L 49/253* (2013.01); *H04L 49/40* (2013.01)

(56) References Cited

U.S. PATENT DOCUMENTS

| | | | |
|---|---|---|---|
| 2003/0128712 A1* | 7/2003 | Moriwaki | H04L 49/608 370/412 |
| 2004/0037322 A1 | 2/2004 | Sukonik et al. | |
| 2010/0146328 A1* | 6/2010 | Yochai | G06F 11/1438 714/4.12 |
| 2017/0046296 A1 | 2/2017 | Han et al. | |

FOREIGN PATENT DOCUMENTS

| | | |
|---|---|---|
| CN | 103955436 A | 7/2014 |
| EP | 3131017 A1 | 2/2017 |
| EP | 1530854 B1 | 9/2017 |

OTHER PUBLICATIONS

Nishi, H., et al., "A Network Switch for Supporting High-Performance Parallel Processing by Computers Distributed in Local Areas," XP001116205, vol. 32, No. 14, Dec. 1, 2001, 10 pages.

Foreign Communication From a Counterpart Application, European Application No. 18157657.0, Extended European Search Report dated Apr. 30, 2018, 9 pages.

Foreign Communication From a Counterpart Application, Chinese Application No. 201710112079.0, Chinese Office Action dated Mar. 4, 2019, 10 pages.

Foreign Communication From a Counterpart Application, Chinese Application No. 201710112079.0, Chinese Search Report dated Feb. 25, 2019, 2 pages.

\* cited by examiner

DATA PROCESSING APPARATUS AND TERMINAL

CROSS-REFERENCE TO RELATED APPLICATION

This application claims priority to Chinese Patent Application No. 201710112079.0 filed on Feb. 28, 2017, which is hereby incorporated by reference in its entirety.

TECHNICAL FIELD

This application relates to the communications field, and in particular, to a data processing apparatus and a terminal in the communications field.

BACKGROUND

Data storage and data exchange are core technologies for a communications device. Currently, a common switched network is an N×N switched network, including an N×N input switch module, N data buffers, and an N×N output switch module. Processes of storing and reading data in the switched network are as follows. During storage, N input ends of the input switch module receive data that is input using an input port of the switched network, and the data received by the N input ends is stored in a data buffer corresponding to each input end using a load balancing method, during reading, the N×N output switch module reads data from the N data buffers, and then exchanges the data to a target output port for data output.

However, in an existing switched network, an output switch module needs to exchange N×N data. When N is relatively large, computation complexity of performing a data exchange by the output switch module is relatively high. Consequently, a data read speed is relatively low.

SUMMARY

This application provides a data processing apparatus, which can reduce output data computation complexity, thereby increasing a data read speed.

According to a first aspect, this application provides a data processing apparatus, where the data processing apparatus includes N apparatus input ends, an input switch module, K buffer areas, a first output switch module, a second output switch module, and M apparatus output ends, and both N and M are integers greater than 1, where N input ends of the input switch module are connected to the N apparatus input ends, and K output ends of the input switch module correspond to the K buffer areas, $K_1$ input ends of the first output switch module correspond to $K_1$ buffer areas in the K buffer areas, M output ends of the first output switch module are connected to the M apparatus output ends, and $K_1$ is greater than or equal to 1, and $K_2$ input ends of the second output switch module correspond to $K_2$ buffer areas in the K buffer areas except the $K_1$ buffer areas, M output ends of the second output switch module are connected to the M apparatus output ends, and $K_2$ is greater than or equal to 1.

According to the data processing apparatus provided in this embodiment of this application, one $K_1 \times M$ first output switch module and one $K_2 \times M$ second output switch module jointly complete computation of K×M output data. This can reduce the output data computation complexity compared with output data computation performed by one K×M output switch module, thereby increasing the data read speed.

It should be understood that a value relationship between K, M, and N is not limited in this embodiment of this application.

Optionally, K may be greater than or equal to M or N. Further, $K_1$ may be greater than or equal to M or N, and $K_2$ may be greater than or equal to M or N.

When K is greater than or equal to N, the N apparatus input ends of the data processing apparatus correspond to the K buffer areas using the input switch module. In this way, the input switch module can store, in any one or more buffer areas in the K buffer areas, data transmitted by a maximum of N apparatus input ends each time. Compared with a case in which the input switch module can store, in the K buffer areas when K is less than N, data transmitted by only K apparatus input ends in the N apparatus input ends each time, this can improve buffer unit utilization, and ensure to an utmost extent that the data transmitted by the N apparatus input ends is simultaneously stored.

When K is greater than M, the data processing apparatus can simultaneously read data from a maximum of K buffer areas each time using the first output switch module and the second output switch module, and output combined data to the M apparatus output ends. This can further increase data read bandwidth while increasing the data read speed compared with a case in which the data processing apparatus can simultaneously read, when K is less than or equal to M, data from only a maximum of M buffer areas each time using one output switch module, and output the data to the M apparatus output ends.

In a possible implementation, the input switch module is configured to obtain data transmitted by the N apparatus input ends. The data processing apparatus further includes a write arbitration module and a read arbitration module. A control end of the write arbitration module is connected to a control end of the input switch module, and the write arbitration module is configured to control the input switch module to evenly store the obtained data in the K buffer areas. A first control end of the read arbitration module is connected to a control end of the first output switch module, a second control end of the read arbitration module is connected to a control end of the second output switch module, and the read arbitration module is configured to control the first output switch module to read data from the $K_1$ buffer areas, control the second output switch module to read data from the $K_2$ buffer areas, and control the first output switch module and the second output switch module to separately transmit the read data to the M apparatus output ends.

Optionally, the write arbitration may enable the M buffer areas to achieve load balancing using a load sharing algorithm such as a load balancing algorithm or a least load first algorithm. This is not limited in this embodiment of this application.

In another possible implementation, the data processing apparatus further includes a buffer management module, a first address end of the buffer management module is connected to a first address end of the read arbitration module, and a second address end of the buffer management module is connected to a first address end of the write arbitration module. The write arbitration module is configured to obtain an address of a first buffer area in the K buffer areas from the buffer management module, and control the input switch module to store obtained first data in the first buffer area. The read arbitration module is configured to control the first output switch module to read second data stored at an address of a second buffer area in the $K_1$ buffer areas, send the address of the second buffer area to the buffer management module, and transmit the second data to a first apparatus output end in the M apparatus output ends, where the first apparatus output end is a destination port of the second data.

Optionally, the first data and the second data may be the same, or may be different. This is not limited in this embodiment of this application.

According to the data processing apparatus provided in this embodiment of this application, the buffer management module can independently manage the M buffer areas. The write arbitration module controls the input switch module to write all input data in storage space of an address obtained from the buffer management module. After reading data from a buffer area, the read arbitration module sends a storage address of the read data to the buffer management module. In this way, the buffer management module can learn a storage space status of each buffer area, and implement address management on each buffer area in order to prevent the write arbitration module from storing data in a buffer area without idle storage space, or prevent the read arbitration module from reading data from a buffer area in which no data is stored.

In still another possible implementation, the first buffer area is the same as the second buffer area, and the first buffer area includes multiple single-port buffer units. The write arbitration module is configured to obtain, from the buffer management module, an address of a first buffer unit in the multiple buffer units included in the first buffer area, and control the input switch module to store the first data at the address of the first buffer unit. The read arbitration module is configured to control the first output switch module to read the second data stored at an address of a second buffer unit in the multiple buffer units except the first buffer unit, send the address of the second buffer unit to the buffer management module, and transmit the second data to the first apparatus output end.

It should be understood that the buffer area in this embodiment of this application may be multiple single-port buffers or one two-port buffer. A single-port buffer indicates that simultaneous execution of a read operation and a write operation is not allowed, that is, one-time data processing can be only data read or data write. The two-port buffer indicates that simultaneous execution of a read operation and a write operation are allowed, that is, one-time data processing can be data read and data write simultaneously.

According to the data processing apparatus provided in this embodiment of this application, a parallel processing capability of the data processing apparatus can be improved when the buffer area is a two-port buffer, and cost overheads of the data processing apparatus can be reduced when the buffer area is multiple single-port buffers.

In still another possible implementation, if a priority of storing data by the write arbitration module is higher than a priority of reading data by the read arbitration module, the write arbitration module is configured to collect statistics about a data storage status of each of the multiple buffer units, set, according to the data storage status of each of the multiple buffer units, a buffer unit whose stored-data volume is less than a first threshold in the multiple buffer units as the first buffer unit, and send, to the buffer management module, first request information used to request the address of the first buffer unit. The buffer management module is configured to send a write address of the first buffer unit to the write arbitration module according to the first request information, where the write address of the first buffer unit is an address of idle storage space in the first buffer unit, and the write arbitration module is further configured to obtain the write address transmitted by the buffer management module, and control the input switch module to store the first data at the write address.

It should be understood that a data processing manner of the data processing apparatus may be classified into two manners, a read first manner and a write first manner. In the read first manner, a priority of a data read operation is higher than a priority of a data write (storage) operation. In the write first manner, a priority of a data write operation is higher than a priority of a data read operation.

The read first manner indicates that in a data processing process, it is ensured that the data processing apparatus can first read data from a buffer area in which the data is stored and output the data to an apparatus output end, and can subsequently write data in a buffer area with idle storage space.

The write first manner indicates that in a data processing process, it is ensured that the data processing apparatus can first store data in a buffer area with idle storage space, and can subsequently read data from a buffer area in which the data is stored.

In still another possible implementation, a feedback end of the write arbitration module is connected to a feedback end of the read arbitration module, the write arbitration module is further configured to send, to the read arbitration module, first feedback information used to indicate that the first buffer unit is currently storing data, and the read arbitration module is further configured to set, according to the first feedback information, a buffer unit whose stored-data volume is greater than a second threshold in the multiple buffer units except the first buffer unit as the second buffer unit, control the first output switch module to read the second data stored in the second buffer unit, send the address of the second buffer unit to the buffer management module, and transmit the second data to the first apparatus output end.

In still another possible implementation, if a priority of reading data by the read arbitration module is higher than a priority of storing data by the write arbitration module, the read arbitration module is configured to collect statistics about a data storage status of each of the multiple buffer units, set, according to the data storage status of each of the multiple buffer units, a buffer unit whose stored-data volume is greater than a third threshold in the multiple buffer units as the second buffer unit, and send, to the buffer management module, second request information used to request the address of the second buffer unit. The buffer management module is configured to send a read address of the second buffer unit to the read arbitration module according to the second request information, where the read address of the second buffer unit is an address of storage space in which the second data is stored in the second buffer unit, and the read arbitration module is further configured to obtain the read address transmitted by the buffer management module, and control the first output switch module to read the second data from the read address.

In still another possible implementation, a feedback end of the write arbitration module is connected to a feedback end of the read arbitration module, the read arbitration module is further configured to send, to the write arbitration module, second feedback information used to indicate that the second buffer unit is currently reading data, and the write arbitration module is further configured to set, according to the second feedback information, a buffer unit whose stored-data volume is less than a fourth threshold in the multiple buffer units except the second buffer unit as the first buffer unit, and control the input switch module to store the first data at the address of the first buffer unit.

In still another possible implementation, the read arbitration module is further configured to control the second output switch module to read third data stored in a third buffer area in the $K_2$ buffer areas, transmit the third data to a second apparatus output end in the M apparatus output ends, and send an address of the third buffer area to the buffer management module, where the second apparatus output end is a destination port of the third data.

According to the data processing apparatus provided in this embodiment of this application, the read arbitration module and the write arbitration module may feed back information about a read operation or a write operation in a timely manner, and instruct, after performing the read operation or the write operation, the buffer management module to update a data storage status in order to improve processing efficiency of the data processing apparatus.

In still another possible implementation, the data processing apparatus further includes a first rearrangement module and a second rearrangement module, where the M output ends of the first output switch module are connected to M input ends of the first rearrangement module, and the M output ends of the second output switch module are connected to M input ends of the second rearrangement module, M output ends of the first rearrangement module are connected to the M apparatus output ends, and M output ends of the second rearrangement module are connected to the M apparatus output ends. The read arbitration module is further configured to control the first output switch module to transmit the read data to the first rearrangement module, and control the second output switch module to transmit the read data to the second rearrangement module. The first rearrangement module is configured to obtain the data transmitted by the first output switch module, sort data that is to be output from a same apparatus output end, and transmit the data to the corresponding apparatus output end according to a sorting result, and the second rearrangement module is configured to obtain the data read by the second output switch module, sort data that is to be output from a same apparatus output end, and transmit the data to the corresponding apparatus output end according to a sorting result.

Optionally, the first rearrangement module and the second rearrangement module may sort data according to a first in first out principle, that is, sort data for a same apparatus output end according to a buffer time sequence in a buffer area.

The data processing apparatus provided in this embodiment of this application sorts output data using a rearrangement module, and can preferentially output first-in data in order to reduce a buffer occupation delay of the rearrangement module.

In still another possible implementation, the data processing apparatus further includes a queue management module, a first address end of the queue management module is connected to a second address end of the write arbitration module, and a second address end of the queue management module is connected to a second address end of the read arbitration module. The queue management module is configured to obtain data information transmitted by the write arbitration module, where the data information includes a source port, a destination port, and a storage address for storing the data that are of data obtained by the write arbitration module, generate a cell descriptor (CD) according to the data information, add the CD to an output queue, and output the CD to the read arbitration module using the output queue, where a source port of the output queue is the source port of the data, a destination port of the output queue is the destination port of the data, the N apparatus input ends include the source port of the data, and the N apparatus output ends includes the destination port of the data, and the read arbitration module is configured to obtain the CD transmitted by the queue management module, control, according to the CD, the output switch module to read the data stored at the storage address, send the storage address to the buffer management module, and control the output switch module corresponding to the storage address to output the data to the destination port of the data.

According to a second aspect, this application provides a terminal, and the terminal includes the data processing apparatus according to the foregoing first aspect or various implementations of the first aspect.

DESCRIPTION OF EMBODIMENTS

The following describes technical solutions of this application with reference to accompanying drawings.

Figure 1:
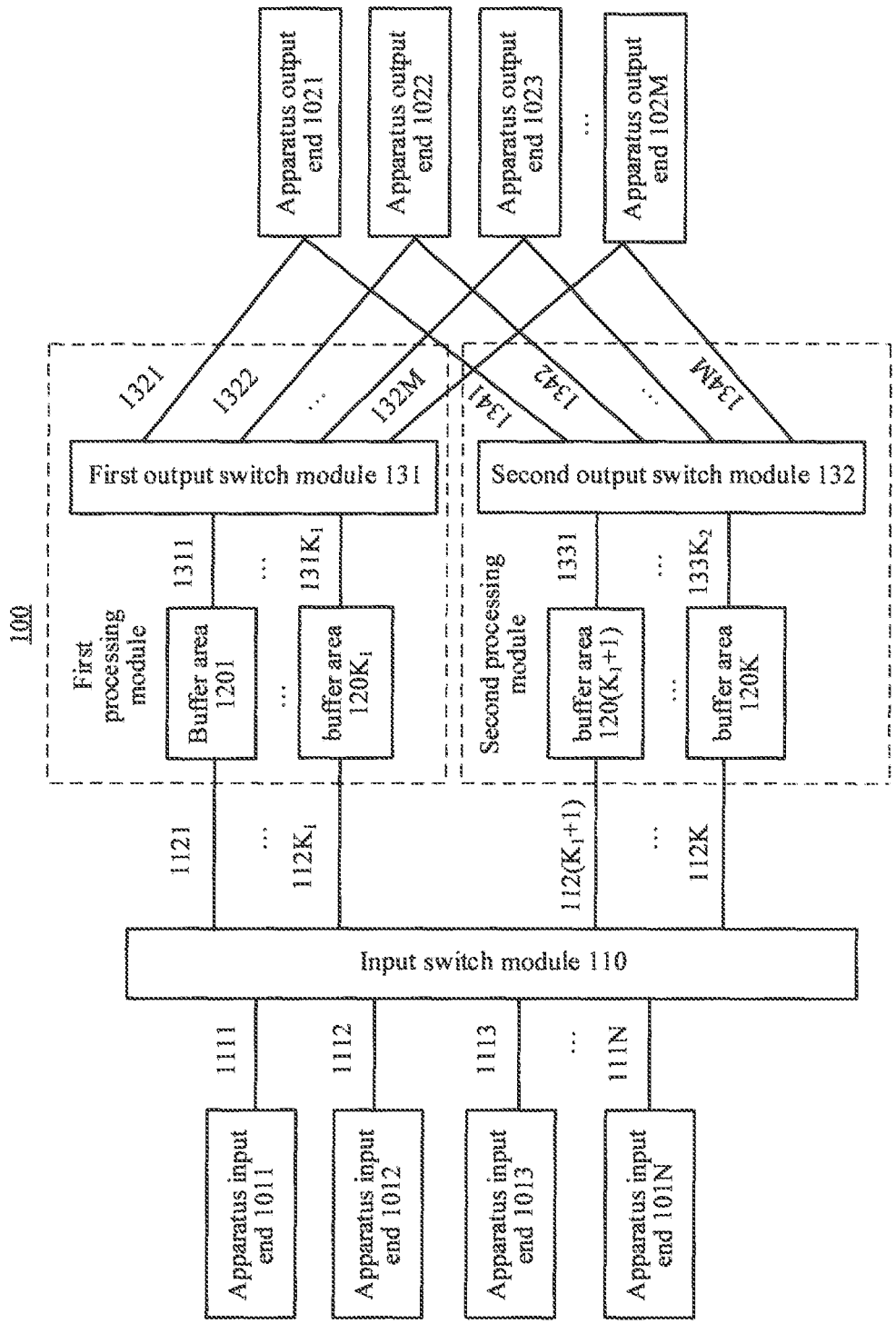
FIG. 1 is a schematic block diagram of a data processing apparatus according to an embodiment of this application.

FIG. 1 shows a data processing apparatus 100 according to an embodiment of this application. As shown in FIG. 1, the data processing apparatus 100 includes N apparatus input ends (apparatus input ends 1011 to 101N shown in FIG. 1), an input switch module 110, K buffer areas (buffer areas 1201 to 120K shown in FIG. 1), a first output switch module 131, a second output switch module 132, and M apparatus output ends (apparatus output ends 1021 to 102M shown in FIG. 1). Both N and M are integers greater than 1.

The input switch module 110 includes N input ends (input ends 1111 to 111N shown in FIG. 1) and K output ends (output ends 1121 to 112K shown in FIG. 1). The input ends 1111 to 111N of the input switch module 110 are connected to the apparatus input ends 1011 to 101N, and the output ends 1121 to 112K of the input switch module 110 respectively correspond to the K buffer areas.

The first output switch module 131 includes $K_1$ input ends (input ends 1311 to 131$K_1$ shown in FIG. 1) and M output ends (output ends 1321 to 132M shown in FIG. 1). The input ends 1311 to 131$K_1$ of the first output switch module 131 respectively correspond to $K_1$ buffer areas (buffer areas 1201 to 120$K_1$ shown in FIG. 1) in the K buffer areas, the output ends 1321 to 132M of the first output switch module 131 are connected to the apparatus output ends 1021 to 102M, and $K_1$ is greater than or equal to 1.

The second output switch module 132 includes $K_2$ input ends (input ends 1331 to 133$K_2$ shown in FIG. 1) and M output ends (output ends 1341 to 134M shown in FIG. 1). The input ends 1331 to 133$K_2$ of the second output switch module 132 respectively correspond to $K_2$ buffer areas in the K buffer areas. It can be understood that the $K_2$ buffer areas are buffer areas (buffer areas 120($K_1$+1) to 120K shown in FIG. 1) in the K buffer areas except the $K_1$ buffer areas corresponding to the first output switch module 131, the output ends 1341 to 134M of the second output switch module 132 are connected to the apparatus output ends 1021 to 102M, and $K_2$ is greater than or equal to 1.

Optionally, after combining data that is separately obtained by the first output switch module 131 and the second output switch module 132 and that is transmitted to a same apparatus output end, the first output switch module 131 and the second output switch module 132 transmit the data to a corresponding apparatus output end. This is not limited in this embodiment of this application.

It should be further understood that in this embodiment of this application, buffer areas are divided into only two groups, and each group of buffer areas correspond to one output switch module, that is, an example of two output switch modules (i.e., the first output switch module 131 and the second output switch module 132) is used for illustration. In this embodiment of the present disclosure, the buffer areas 1201 to 120K may also be divided into more groups, and each group of buffer areas correspond to one output switch module, that is, multiple output switch modules are included. This is not limited in this embodiment of this application.

In an optional embodiment, the data processing apparatus 100 provided in this embodiment of this application may include the N apparatus input ends (the apparatus input ends 1011 to 101N shown in FIG. 1), the input switch module 110, multiple processing modules (FIG. 1 shows a first processing module and a second processing module), and the M apparatus output ends (the apparatus output ends 1021 to 102M shown in FIG. 1). Both N and M are integers greater than 1. The first processing module includes the $K_1$ buffer areas (FIG. 1 shows the buffer areas 1201 to 120$K_1$) and the first output switch module 131, and the second processing module includes the $K_2$ buffer areas (FIG. 1 shows the buffer areas 120($K_1$+1) to 120K) and the second output switch module 132. In FIG. 1, buffers in the first group of buffer areas correspond to the first output switch module 131, and the second group of buffer areas correspond to the second output switch module 132.

According to the data processing apparatus 100 provided in this embodiment of this application, one $K_1 \times M$ first output switch module 131 and one $K_2 \times M$ second output switch module 132 jointly complete computation of $K \times M$ output data. Compared with output data computation performed using one $K \times M$ output switch module, this can reduce output data computation complexity, thereby increasing a data read speed.

It should be understood that a value relationship between K, M, and N is not limited in this embodiment of this application.

Optionally, K may be greater than or equal to M or N. Further, $K_1$ may be greater than or equal to M or N, and $K_2$ may be greater than or equal to M or N.

When K is greater than or equal to N, the N apparatus input ends of the data processing apparatus correspond to the K buffer areas using the input switch module. In this way, the input switch module can store, in any one or more buffer areas in the K buffer areas, data transmitted by the N apparatus input ends each time. Compared with a case in which the input switch module can store, in the K buffer areas when K is less than N, data transmitted by a maximum of only K apparatus input ends in the N apparatus input ends each time, this can improve buffer unit utilization, and ensure to an utmost extent that the data transmitted by the N apparatus input ends is simultaneously stored.

When K is greater than M, the data processing apparatus 100 can simultaneously read data from a maximum of K buffer areas 1201 to 120K each time using the first output switch module 131 and the second output switch module 132, and output combined data to the M apparatus output ends 1021 to 102M. This can further increase data read bandwidth while increasing the data read speed compared with a case in which the data processing apparatus 100 can simultaneously read, when K is less than or equal to M, data from only a maximum of M buffer areas each time using one output switch module, and output the data to the M apparatus output ends 1021 to 102M.

Optionally, all input ends 1011 to 101N of the input switch module 110, the first output switch module 131, and the second output switch module 132 may be virtual ports.

In an optional embodiment, the K output ends 1121 to 112K of the input switch module 110 correspond to the K buffer areas 1201 to 120K one to one. It can be understood that the output ends 1121 to 112K of the input switch module 110 are respectively connected to the buffer areas 1201 to 120K, that is, an output end of the input switch module 110 may write data in a buffer area corresponding to the output end.

In another optional embodiment, the $K_1$ input ends of the first output switch module 131 correspond to the $K_1$ buffer areas one to one. It can be understood that the input ends 1311 to 131$K_1$ of the first output switch module 131 are respectively connected to the buffer areas 1201 to 120$K_1$, that is, an input end of the first output switch module 131 may read data from a buffer area corresponding to the input end in the $K_1$ buffer areas. The $K_2$ input ends of the second output switch module 132 correspond to the $K_2$ buffer areas one to one. It can be understood that the input ends 1331 to 133$K_2$ of the second output switch module 132 are respectively connected to the buffer areas 120($K_1$+1) to 120K, that is, an input end of the second output switch module 132 may read data from a buffer area corresponding to the input end in the $K_2$ buffer areas.

In still another optional embodiment, the output ends 1321 to 132M of the first output switch module 131 are respectively connected to the apparatus output ends 1021 to 102M, and the output ends 1341 to 134M of the second output switch module 132 are respectively connected to the apparatus output ends 1021 to 102M. It can be understood that for each apparatus output end, data combining processing needs to be performed first on data that is output by an output end of the first output switch module 131 connected to each apparatus output end and data that is output by an output end of the second output switch module 132 connected to each apparatus output end, and then the apparatus output end outputs combined data. This is not limited in this embodiment of this application.

Optionally, the input switch module 110 may be an input cross-bar (IXB). The IXB may include K N-to-1 selectors (for example, if the input switch module 110 includes 10 input ends and 16 output ends, the IXB includes 10 16-to-1 selectors). The first output switch module 131 and the second output switch module 132 may be output cross-bars (OXB). The first output switch module 131 may include $K_1$ M-to-1 selectors (for example, if the first output switch module 131 includes eight input ends and 12 output ends, an OXB1 includes eight 12-to-1 selectors). The second output switch module 132 may include $K_2$ M-to-1 selectors (for example, if the second output switch module 132 includes eight input ends and 12 output ends, an OXB2 includes eight 12-to-1 selectors). This is not limited in this embodiment of this application.

It should be understood that a buffer may include a read-only memory (ROM) or a random access memory (RAM). In addition, the buffer is classified into a two-port buffer and a single-port buffer. The two-port buffer allows simultaneously performing a data write operation and a data read operation on the two-port buffer, and the single-port buffer allows performing only a data write operation or a data read operation on the single-port buffer at a time.

According to the data processing apparatus 100 provided in this embodiment of this application, a degree of data processing parallelism can be improved when the buffer area is the two-port buffer.

Figure 2:
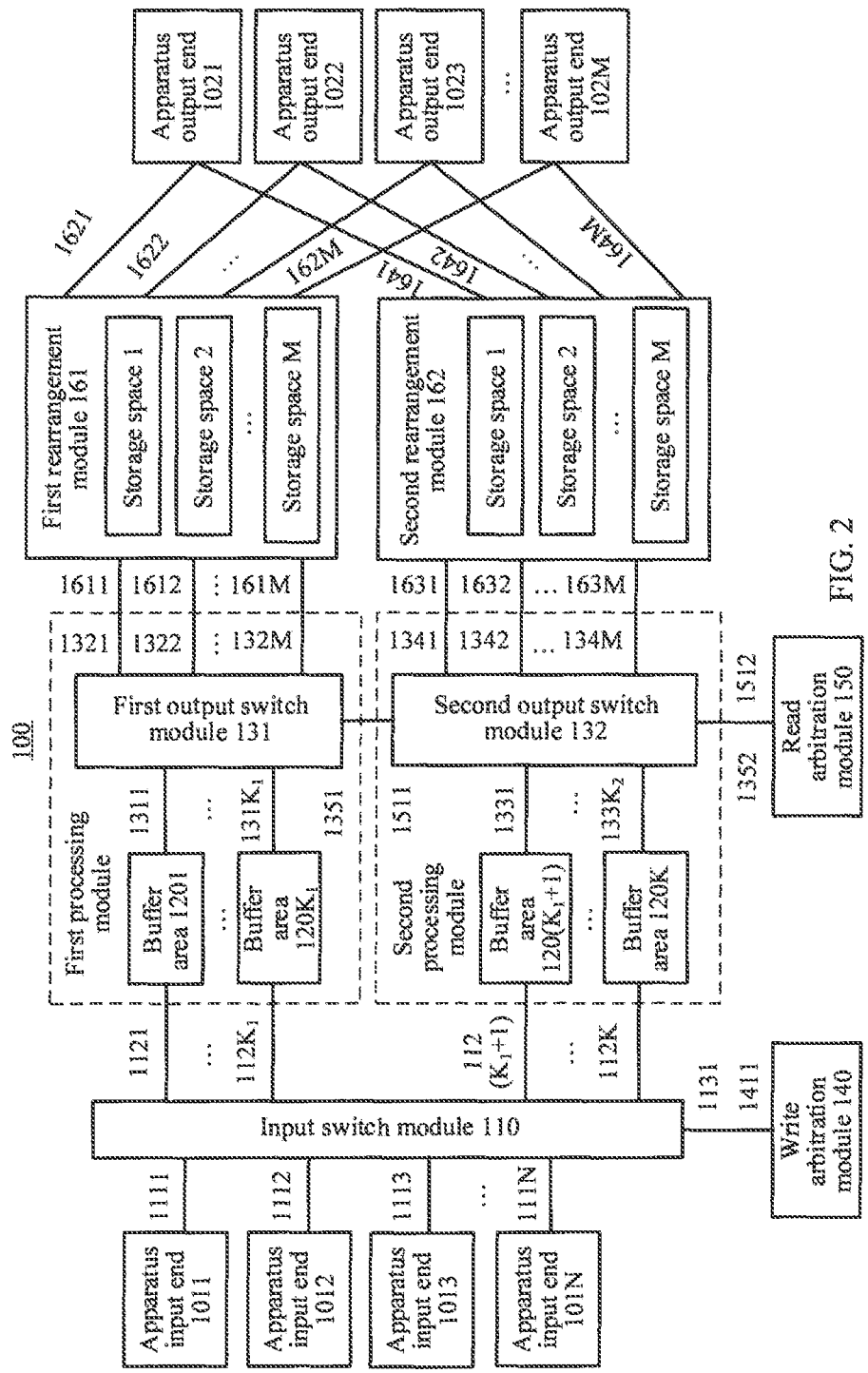
FIG. 2 is a schematic block diagram of another data processing apparatus according to an embodiment of this application.

Optionally, as shown in FIG. 2, the data processing apparatus 100 provided in this embodiment of this application may further include a write arbitration module 140 and a read arbitration module 150. A control end 1411 of the write arbitration module 140 is connected to a control end 1131 of the input switch module 110, and a control end 1512 of the read arbitration module 150 is connected to a control end 1352 of the second output switch module 132. Further, a control end 1511 of the second output switch module 132 is connected to a control end 1351 of the first output switch module 131.

The input switch module 110 is configured to obtain data transmitted by the N apparatus input ends 1011 to 101N.

The write arbitration module 140 is configured to control the input switch module 110 to evenly store the obtained data in the K buffer areas 1201 to 120K.

The read arbitration module 150 is configured to control the first output switch module 131 to read data from the $K_1$ buffer areas, control the second output switch module 132 to read data from the $K_2$ buffer areas, and control the first output switch module 131 and the second output switch module 132 to transmit the read data to the M apparatus output ends 1021 to 102M.

Optionally, as shown in FIG. 2, the data processing apparatus 100 provided in this embodiment of this application may further include a first rearrangement module 161 and a second rearrangement module 162. The output ends 1321 to 132M of the first output switch module 131 are connected to input ends 1611 to 161M of the first rearrangement module 161 one to one, and the output ends 1341 to 134M of the second output switch module 132 are connected to input ends 1631 to 163M of the second rearrangement module 162 one to one. Output ends 1621 to 162M of the first rearrangement module 161 are connected to the apparatus output ends 1021 to 102M one to one, and output ends 1641 to 164M of the second rearrangement module are connected to the apparatus output ends 1021 to 102M one to one.

The read arbitration module 150 is further configured to control the first output switch module 131 to transmit the read data to the first rearrangement module 161, and control the second output switch module 132 to transmit the read data to the second rearrangement module 162.

The first rearrangement module 161 is configured to obtain the data transmitted by the first output switch module 131, when there are multiple pieces of data with a same destination port, sort the data with the same destination port, and transmit the data to a corresponding apparatus output end according to a sorting result.

The second rearrangement module 162 is configured to obtain the data read by the second output switch module 132, when there are multiple pieces of data with a same destination port, sort the data with the same destination port, and transmit the data to a corresponding apparatus output end according to a sorting result.

In an optional embodiment, the input switch module 110 may obtain target data that is input using a target apparatus input end. The write arbitration module 140 may control the input switch module 110 to store the target data in a target buffer area. There may be one or more pieces of target data. This is not limited in this embodiment of this application.

In another optional embodiment, the read arbitration module 150 may control the first output switch module 131 to read target data from a target buffer area included in the $K_1$ buffer areas, control the second output switch module 132 to read target data from a target buffer area included in the $K_2$ buffer areas, control the first output switch module 131 to transmit the read target data to a target input end of the first rearrangement module 161, and control the second output switch module 132 to transmit the read target data to a target input end of the second rearrangement module 162.

It should be understood that the target input end of the first rearrangement module 161 is an input end that is in the first rearrangement module 161 and that is configured to transmit the target data to a target output end of the first rearrangement module 161. The target output end is an output end that is in the first rearrangement module 161 and that is connected to a destination port of the data. The destination port of the data is one or more output ends of the data processing apparatus 100. The target input end and a target output end of the second rearrangement module 162 are similar to those of the first rearrangement module 161. Details are not repeatedly described herein.

In an optional embodiment, the first rearrangement module 161 may obtain target data transmitted by the first output switch module 131. In storage space of the first rearrangement module 161, when there are multiple pieces of data whose destination ports are the same as a destination port of the target data, the data with the same destination port is sorted, and then the data with the same destination port is transmitted to the destination port according to a sorting result. The M apparatus output ends 1021 to 102M include the destination port. A processing method of the second rearrangement module 162 is similar to a processing method of the first rearrangement module 161. Details are not repeatedly described herein.

In another optional embodiment, the first rearrangement module 161 may obtain target data transmitted by the first output switch module 131. In storage space of the first rearrangement module 161, when there is one piece of data whose destination port is the same as a destination port of the target data, for example, when there is no other data whose destination port is the same as the destination port of the target data except the target data and there is one piece of target data, the target data is transmitted to the destination port. The M apparatus output ends 1021 to 102M include the destination port. A processing method of the second rearrangement module 162 is similar to a processing method of the first rearrangement module 161. Details are not repeatedly described herein.

Optionally, the first rearrangement module 161 and the second rearrangement module 162 may be rearrangement buffers. Each input end of a rearrangement buffer may independently correspond to storage space in the rearrangement buffer, and the storage space corresponding to the input end further corresponds to an output end whose sequence number is the same as a sequence number of the input end. For example, as shown in FIG. 2, the input end 1611 of the first rearrangement module 161 corresponds to storage space 1, and the output end 1621 also corresponds to the storage space 1. That is, data received by the input end 1611 is stored in the storage space 1, and then the output end 1621 outputs the data in the storage space 1. The foregoing storage space may be buffer space. For ease of illustration, it can be understood that storage space corresponding to an input end is storage space of an output end whose sequence number is the same as a sequence number of the input end. Data stored in each piece of storage space may be data with a same destination port in the foregoing manner. This is not limited in this embodiment of this application.

Optionally, there may be one or more pieces of target data. When there is one piece of target data, a target input end of the foregoing data processing apparatus 100 may be one apparatus input end, the foregoing target buffer area may be one buffer area, a target input end of the first rearrangement module 161 or the second rearrangement module 162 may be one input end, and a target output end of the first rearrangement module 161 or the second rearrangement module 162 may be one output end. In this way, provided that storage space of the first rearrangement module 161 or the second rearrangement module 162 includes the target data and includes one or more other pieces of data whose destination ports are the same as a destination port of the target data, the first rearrangement module 161 or the second rearrangement module 162 can sort the data, and then output the data to the destination port according to a sorting result. The arrangement is based on a first in first out principle, that is, data with a same destination port is output according to a buffer time sequence in a buffer unit.

In addition, when there are multiple pieces of target data, the foregoing target apparatus input end be one or more target apparatus input ends in the N apparatus input ends. For example, one apparatus input end inputs multiple pieces of data, or each of multiple apparatus input ends inputs one piece of data. The foregoing target buffer area may be one or more target buffer areas. For example, multiple pieces of data are stored in one buffer area, or one piece of data is stored in each of multiple buffer areas. The target input end of the first rearrangement module 161 or the second rearrangement module 162 may be one input end. For example, when the foregoing target data is separately stored in the first rearrangement module 161 and the second rearrangement module 162, and multiple pieces of data included in the target data have a same destination port, the first rearrangement module 161 and the second rearrangement module 162 may separately sort data in storage space, and separately output the data to the destination port according to a sorting result, or when multiple pieces of data included in the foregoing target data have different destination ports, the first rearrangement module 161 and the second rearrangement module 162 may view respective storage space to check whether there is other data whose destination port is the same as the destination port of the target data. If yes, the first rearrangement module 161 and the second rearrangement module 162 separately sort data with different destination ports, and then output the data according to a sorting result.

It should be further understood that data read by the read arbitration module 150 and data stored by the write arbitration module 140 may be the same, or may be different. When the data read by the read arbitration module 150 is target data written by the write arbitration module 140, it can be understood as a process of inputting and outputting the target data by the data processing apparatus 100. When the data read by the read arbitration module 150 and the target data written by the write arbitration module 140 are different, it can be understood as that the write arbitration module 140 controls the input switch module 110 to write the target data in a target buffer, while the read arbitration module 150 simultaneously controls the first output switch module 131 and the second output switch module 132 to read, from respective corresponding buffer areas in a current round, other target data stored before the current round. This is not limited in this embodiment of this application.

For example, the foregoing input switch module 110 receives, using the input end 1111, target data transmitted by the apparatus input end 1011, and the write arbitration module 140 controls the input switch module 110 to store the target data in the buffer area 120K$_1$ (for example, a stored-data volume of the buffer area 120K$_1$ is smallest). That is, the input switch module 110 outputs, from the output end 112K$_1$ to the buffer area 120K$_1$, the target data received by the input end 1111, and the read arbitration module 150 may control the input end 131K$_1$ of the first output switch module 131 to read the target data from the buffer area 120K$_1$. In addition, when the read arbitration module 150 learns that the destination port of the target data is an apparatus output end 1022, the read arbitration module 150 transmits the target data from an output end 1322 to an input end 1612 of the first rearrangement module 161. When the storage space of the first rearrangement module 161 further includes one or more other pieces of data whose destination ports are the same as the destination port of the target data, the first rearrangement module 161 may sort multiple pieces of data whose destination ports are the apparatus output end 1022, and then transmit the data to the apparatus output end 1022 according to a sorting result using an output end 1622 of the first rearrangement module 161.

For another example, the foregoing input switch module 110 receives, respectively using the input end 1111 and an input end 1113, first data transmitted by the apparatus input end 1011 and second data transmitted by an apparatus input end 1013, and the write arbitration module 140 controls the input switch module 110 to store the first data in the buffer area 120K$_1$ (for example, a stored-data volume of the buffer area 120K$_1$ is smallest), and to store the second data in the buffer area 120(K$_1$+1) (for example, a stored-data volume of the buffer area 120(K$_1$+1) is smallest). That is, the input switch module 110 outputs, from an output end 112K$_1$ to the buffer area 120K$_1$, the first data received by the input end 1111, and outputs, from an output end 112(K$_1$+1) to the buffer area 120(K$_1$+1), the second data received by the input end 1113, and the read arbitration module 150 may control the input end 131K$_1$ of the first output switch module 131 to read the first data from the buffer area 120K$_1$, and control the input end 1331 of the second output switch module 132 to read the second data from the buffer area 120(K$_1$+1). In addition, when the read arbitration module 150 learns that a destination port of the first data is an apparatus output end 1022, and a destination port of the second data is an apparatus output end 1023, the read arbitration module 150 may transmit the first data from the output end 1322 of the first output switch module 131 to the input end 1612 of the first rearrangement module 161. When storage space corresponding to the input end 1612 of the first rearrangement module 161 includes multiple pieces of data, that is, when storage space of the first rearrangement module 161 includes multiple data whose destination ports are the apparatus output end 1022, the first rearrangement module 161 sorts the multiple pieces of data whose destination ports are the apparatus output end 1022, and transmits the data to the apparatus output end 1022 according to a sorting result using the output end 1622 of the first rearrangement module 161.

The read arbitration module 150 may further transmit the second data from an output end 1343 of the second output switch module 132 to an input end 1633 of the second rearrangement module 162. When storage space corresponding to the input end 1633 of the second rearrangement module 162 includes multiple pieces of data, that is, when storage space of the second rearrangement module 162 includes multiple pieces of data whose destination ports are the apparatus output end 1023, the second rearrangement module 162 sorts the multiple pieces of data whose destination ports are the apparatus output end 1023, and transmits the data to the apparatus output end 1023 according to a sorting result using an output end 1643 of the second rearrangement module 162.

Optionally, the destination port of the first data may be the same as the destination port of the second data. If both the destination port of the first data and the destination port of the second data are the apparatus output end 1022, the read arbitration module 150 may combine the first data transmitted by the output end 1322 of the first output switch module 131 and sorted by the first rearrangement module 161 with the second data transmitted by the output end 1343 of the second output switch module 132 and sorted by the second rearrangement module 162, and transmit combined data to the apparatus output end 1022. This is not limited in this embodiment of this application.

In conclusion, according to the data processing apparatus 100 provided in this embodiment of this application, multiple output switch modules perform output switch computation on output data. This can simplify complexity of an output switch module, thereby improving data processing efficiency.

In addition, the data processing apparatus 100 provided in this embodiment of this application may simultaneously read data from the K buffer areas 1201 to 120K using multiple rearrangement modules, and output the data to a corresponding apparatus output end, and perform buffer management and matching between a speed of reading data from a buffer area by an output switch module and a speed of outputting data to an apparatus output end by a rearrangement module in order to increase data read bandwidth.

Figure 3:
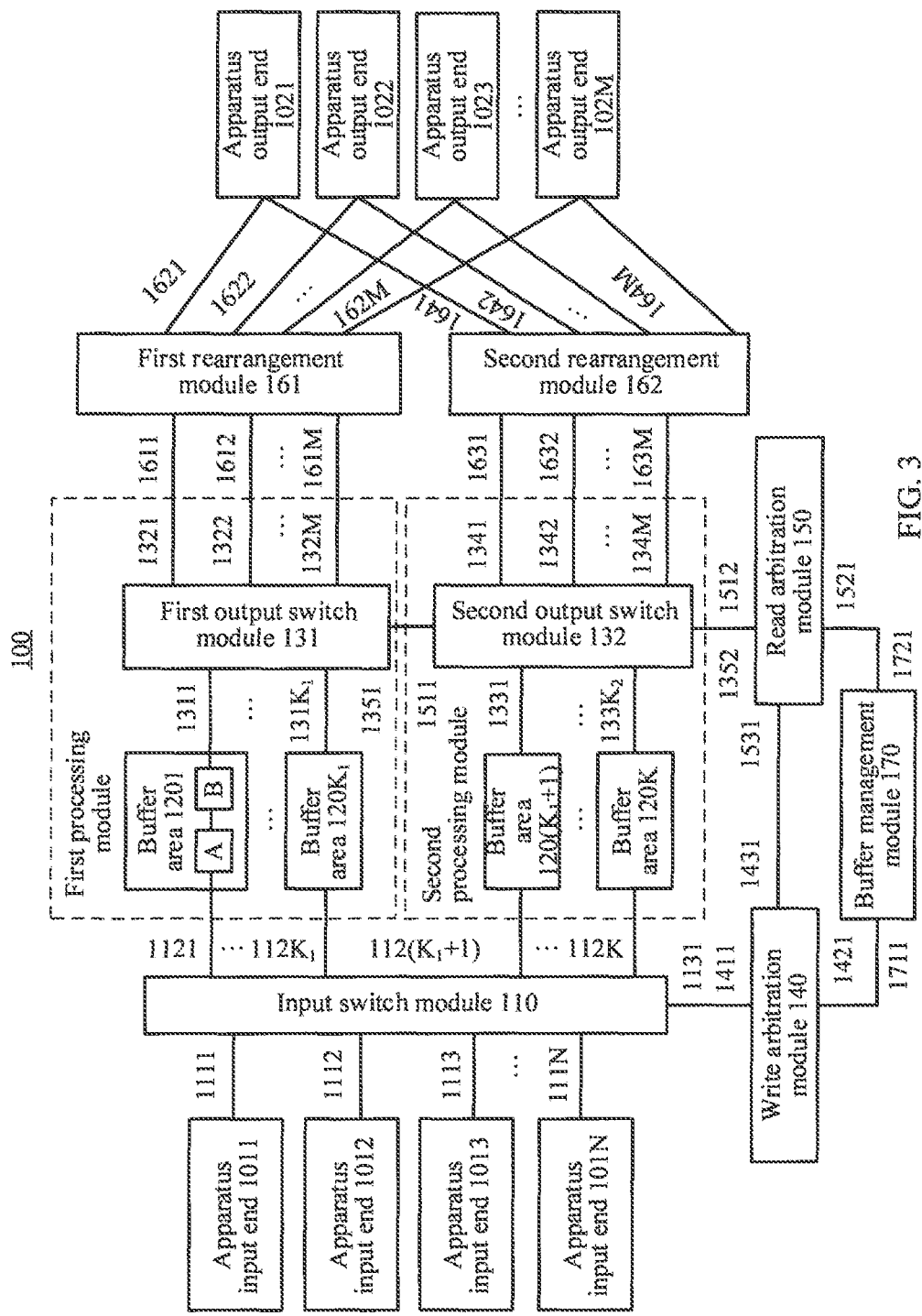
FIG. 3 is a schematic block diagram of still another data processing apparatus according to an embodiment of this application.

Optionally, as shown in FIG. 3, the data processing apparatus 100 may further include a buffer management module 170. An address end 1711 of the buffer management module 170 is connected to an address end 1421 of the write arbitration module 140, and an address end 1721 of the buffer management module 170 is connected to an address end 1521 of the read arbitration module 150.

The write arbitration module 140 is configured to obtain an address of a first buffer area in the K buffer areas 1201 to 120K from the buffer management module 170, and control the input switch module 110 to store obtained first data in the first buffer area.

The read arbitration module 150 is configured to control the first output switch module 131 to read second data stored at an address of a second buffer area in the $K_1$ buffer areas 1201 to 120K, send the address of the second buffer area to the buffer management module 170, and control the first output switch module 110 to transmit the second data to a first apparatus output end in the M apparatus output ends 1021 to 102M using the first rearrangement module 161, where the first apparatus output end is a destination port of the second data.

Optionally, the first buffer area may be any one or more of the K buffer areas 1201 to 120K. For example, the first buffer area may be a target buffer area of target data.

Optionally, the first data or the second data may be all or a part of the target data obtained by the input switch module 110. This is not limited in this embodiment of this application.

Optionally, the first buffer area and the second buffer area may be the same, or may be different, and the first data and the second data may be the same, or may be different. This is not limited in this embodiment of this application.

In an optional embodiment, if the first buffer area and the second buffer area are the same, and the first data and the second data are the same, that is, in a same round of data processing, when data read by the read arbitration module 150 is target data written by the write arbitration module 140, the write arbitration module 140 may obtain an address of a target buffer area in the K buffer areas 1201 to 120K, and control the input switch module 110 to store the obtained target data in the target buffer area, and the read arbitration module 150 may control the first output switch module 131 and/or the second output switch module 132 to separately read the target data from a target buffer area in respective corresponding buffer areas, and transmit, using a respective corresponding rearrangement module, the target data to a destination port corresponding to the target data.

In another optional embodiment, if the first buffer area and the second buffer area are different, and the first data and the second data are different, that is, when data read by the read arbitration module 150 and data written by the write arbitration module 140 are different in a same round of data processing, the write arbitration module 140 may obtain an address of the first buffer area in the K buffer areas 1201 to 120K, and control the input switch module 110 to store the obtained first data in the first buffer area, and the read arbitration module 150 may control the first output switch module 131 to read the second data from a buffer area corresponding to the first output switch module 131, and/or control the second output switch module 132 to read third data from a buffer area corresponding to the second output switch module 132, transmit, using the first rearrangement module 161 corresponding to the first output switch module 131, the second data to a destination port corresponding to the second data, and/or transmit, using the second rearrangement module 162 corresponding to the second output switch module 132, the third data to a destination port corresponding to the third data.

Optionally, as shown in FIG. 3, if the first buffer area and the second buffer area are the same (as shown in FIG. 3, both the first buffer area and the second buffer area are the buffer area 1201), and the first buffer area includes multiple single-port buffer units (as shown in FIG. 3, the buffer area 1201 includes a single-port buffer unit A and a single-port buffer unit B).

The write arbitration module 140 may obtain, from the buffer management module 170, an address of a first buffer unit in the multiple buffer units included in the first buffer area, and control the input switch module 110 to store the first data at the address of the first buffer unit.

The read arbitration module 150 may control the first output switch module 131 to read the second data stored at an address of a second buffer unit in the multiple buffer units except the first buffer unit, send the address of the second buffer unit to the buffer management module 170, and transmit the second data to the first apparatus output end. The first apparatus output end is a destination port of the second data.

It should be understood that the single-port buffer allows only a read operation or a write operation at a time. Therefore, when the write arbitration module 140 performs a write operation on the buffer unit A, the read arbitration module 150 cannot perform a read operation on the buffer unit A at the same time.

It should be further understood that if the buffer area is a two-port unit, the buffer management module 170 independently manages an address of each buffer area. The write arbitration module 140 controls the input switch module 110 to write input data in storage space at an address obtained from the buffer management module 170, and the read arbitration module 150 sends, after reading data from the buffer management module 170, a storage address of the read data to the buffer management module 170. In this way, the buffer management module 170 may learn an address at which data is stored in each buffer area, and an address at which no data is stored in order to implement address management on each buffer area.

In addition, if the buffer area includes multiple single-port units, the buffer management module 170 independently manages an address of a buffer unit in each buffer area. The write arbitration module 140 controls the input switch module 110 to write input data in storage space at an address obtained from the buffer management module 170, and the read arbitration module 150 sends, after reading data from the buffer management module 170, a storage address of the read data to the buffer management module 170. In this way, the buffer management module 170 may learn an address at which data is stored in each buffer unit in each buffer area, and an address at which no data is stored in order to implement address management on each buffer unit.

Optionally, the data processing apparatus 100 provided in this embodiment of this application may pre-configure operation priorities of the read arbitration module 150 and the write arbitration module 140, and manage a read operation and a write operation on a buffer area according to respective priorities of the read arbitration module 150 and the write arbitration module 140.

In an optional implementation, if a priority of storing data by the write arbitration module 140 is higher than a priority of reading data by the read arbitration module 150, the write arbitration module 140 may collect statistics about a data storage status of each of the multiple buffer units, set, according to the data storage status of each of the multiple buffer units, a buffer unit whose stored-data volume is less than a first threshold as the first buffer unit in the multiple buffer units, and send, to the buffer management module 170, first request information used to request the address of the first buffer unit. The buffer management module 170 may send a write address of the first buffer unit to the write arbitration module 140 according to the first request information, and the write address of the first buffer unit is an address of idle storage space in the first buffer unit. The write arbitration module 140 may obtain the write address transmitted by the buffer management module 170, and control the input switch module 110 to store the first data at the write address.

Optionally, the write arbitration module 140 selects a first buffer unit from the first buffer area in the K buffer areas 1201 to 120K as a target buffer unit, and stores the first data in the first buffer unit. This can prevent the first data from being stored in a buffer unit without idle storage space. In addition, the write arbitration module 140 may select the first buffer area with idle storage space from the K buffer areas 1201 to 120K using an algorithm such as a load balancing algorithm or a least load first algorithm, and determine the first buffer unit with idle storage space from the first buffer area for storing the first data.

The foregoing used load balancing algorithm or least load first algorithm may be selecting a buffer unit with a smallest stored-data volume from the foregoing K buffer areas 1201 to 120K as the foregoing first buffer area, or selecting, as the first buffer area, a last buffer area from the foregoing K buffer areas 1201 to 120K sorted in descending order of stored-data volumes. The foregoing used load balancing algorithm or least load first algorithm may be selecting, as the foregoing first buffer unit, a buffer unit with a smallest stored-data volume from the multiple buffer units included in the foregoing first buffer area, or selecting, as the first buffer unit, a last buffer unit from the multiple buffer units that are included in the foregoing first buffer area and sorted in descending order of stored-data volumes. This is not limited in this embodiment of this application.

Optionally, as shown in FIG. 3, if a feedback end 1431 of the write arbitration module 140 is connected to a feedback end 1531 of the read arbitration module, the write arbitration module 140 is further configured to send, to the read arbitration module 150, first feedback information used to indicate that the first buffer unit is currently storing data.

The read arbitration module 150 is further configured to set, according to the first feedback information, a buffer unit whose stored-data volume is greater than a second threshold in the multiple buffer units except the first buffer unit as the second buffer unit, control the first output switch module 131 to read the second data stored in the second buffer unit, send the address of the second buffer unit to the buffer management module 170, and transmit the second data to the first apparatus output end. The first apparatus output end is the destination port of the second data.

In another possible implementation, if a priority of reading data by the read arbitration module 150 is higher than a priority of storing data by the write arbitration module 140, the read arbitration module 150 may collect statistics about a data storage status of each of the multiple buffer units, set, according to the data storage status of each of the multiple buffer units, a buffer unit whose stored-data volume is greater than a third threshold in the multiple buffer units as the second buffer unit, and send, to the buffer management module 170, second request information used to request the address of the second buffer unit. The buffer management module 170 may send a read address of the second buffer unit to the read arbitration module 150 according to the second request information, and the read address of the second buffer unit is an address of storage space in which the second data is stored in the second buffer unit. The read arbitration module 150 may obtain the read address transmitted by the buffer management module 170, and control the first output switch module 131 to read the second data from the read address.

Optionally, as shown in FIG. 3, if a feedback end 1431 of the write arbitration module 140 is connected to a feedback end 1531 of the read arbitration module 150, the read arbitration module 150 is further configured to send, to the write arbitration module 140, second feedback information used to indicate that the second buffer unit is currently reading data.

The write arbitration module 140 is further configured to set, according to the second feedback information, a buffer unit whose stored-data volume is less than a fourth threshold in the multiple buffer units except the second buffer unit as the first buffer unit, and control the input switch module 110 to store the first data at the address of the first buffer unit.

Optionally, the read arbitration module 150 is further configured to control the second output switch module 132 to read third data stored in a third buffer area in the $K_2$ buffer areas, transmit the third data to a second apparatus output end in the M apparatus output ends 1021 to 102M, and send an address of the third buffer area to the buffer management module 170. The second apparatus output end is a destination port of the third data.

Figure 4A:
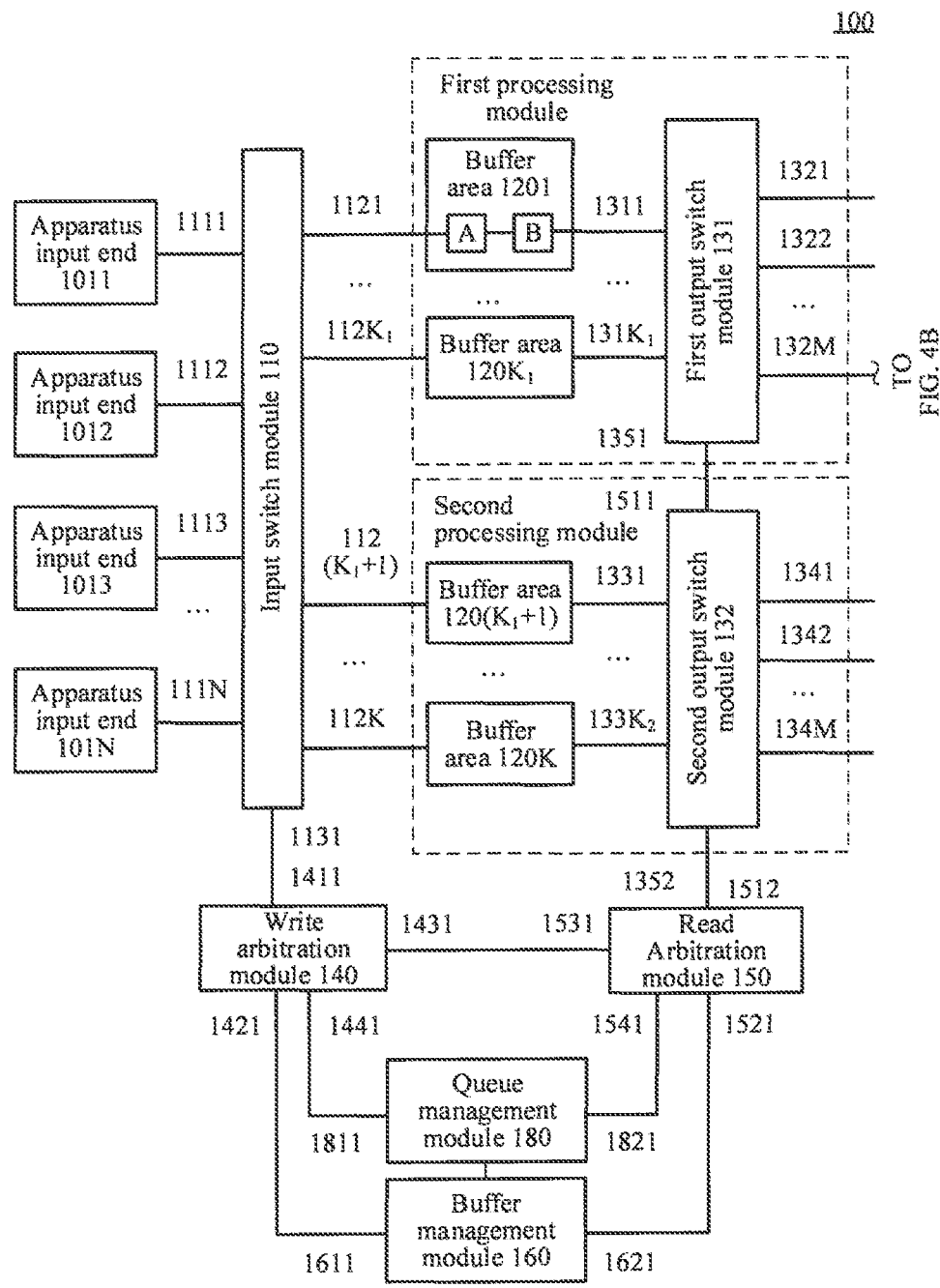
FIGS. 4A and 4B are a schematic block diagram of still another data processing apparatus according to an embodiment of this application.
Figure 4B:
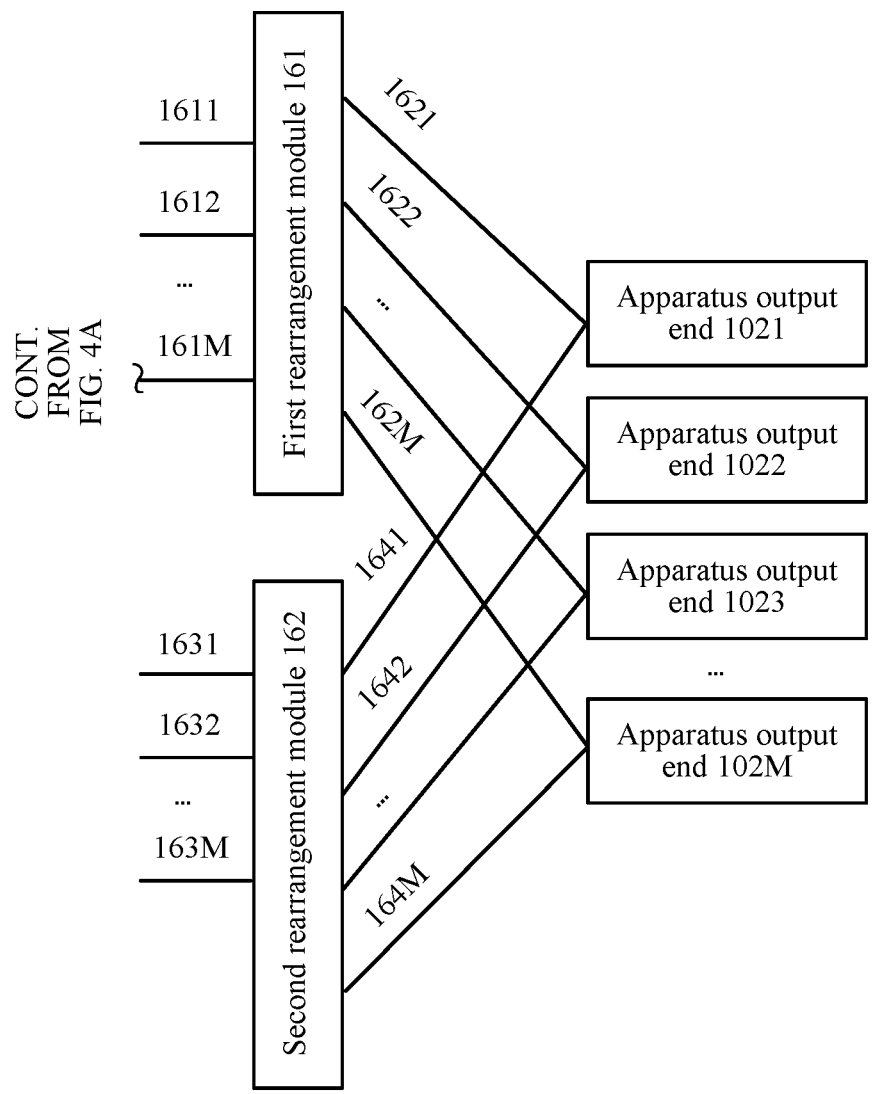

Optionally, as shown in FIG. 4A and FIG. 4B, the data processing apparatus 100 provided in this embodiment of this application further includes a queue management module 180. An address end 1811 of the queue management module 180 is connected to an address end 1441 of the write arbitration module 140, and an address end 1821 of the queue management module 180 is connected to an address end 1541 of the read arbitration module 150.

The queue management module 180 is configured to obtain data information transmitted by the write arbitration module 140, where the data information includes a source port, a destination port, and a storage address for storing the data that are of data obtained by the write arbitration module 140, generate a CD according to the data information, add the CD to an output queue, and output the CD to the read arbitration module 150 using the output queue, where a source port of the output queue is the source port of the data, a destination port of the output queue is the destination port of the data, the N apparatus input ends include the source port of the data, and the N apparatus output ends include the destination port of the data.

The read arbitration module 150 is configured to obtain the CD transmitted by the queue management module 180, control, according to the CD, the output switch module to read the data stored at the storage address, send the storage address to the buffer management module 160, and control the output switch module corresponding to the storage address to output the data to the destination port of the data.

Optionally, when the write arbitration module 140 obtains multiple pieces of data, the write arbitration module 140 may send the foregoing data information for each piece of data. In this way, the queue management module 180 may generate a CD for each piece of data. For example, if the write arbitration module 140 obtains the first data that is input using the apparatus input end 1013 and the second data that is input using the apparatus input end 1014, where the destination port of the first data is the apparatus output end 1022, and the destination port of the second data is the apparatus output end 1023, the queue management module 180 may add a CD of the first data to a second output queue, where an input end of the second output queue is the apparatus input end 1013, and an output end of the second output queue is the apparatus output end 1022, and the queue management module 180 may add a CD of the second data to a third output queue, where an input end of the third output queue is the apparatus input end 1014, and an output end of the third output queue is the apparatus output end 1023.

Optionally, the queue management module 180 may perform queue management according to a first in first out principle. In addition, the queue management module 180 may include N×M output queues, for example, include an output queue whose source port is the apparatus input end 1011 and destination port is the apparatus output end 1021, an output queue whose source port is the apparatus input end 1011 and destination port is the apparatus output end 1022, an output queue whose source port is the apparatus input end 1012 and destination port is the apparatus output end 1022, which are not enumerated herein exhaustively. Certainly, these output queues may be pre-configured, or may be configured when a first piece of data corresponding to any output queue arrives. This is not limited in this embodiment of this application.

Figure 5:
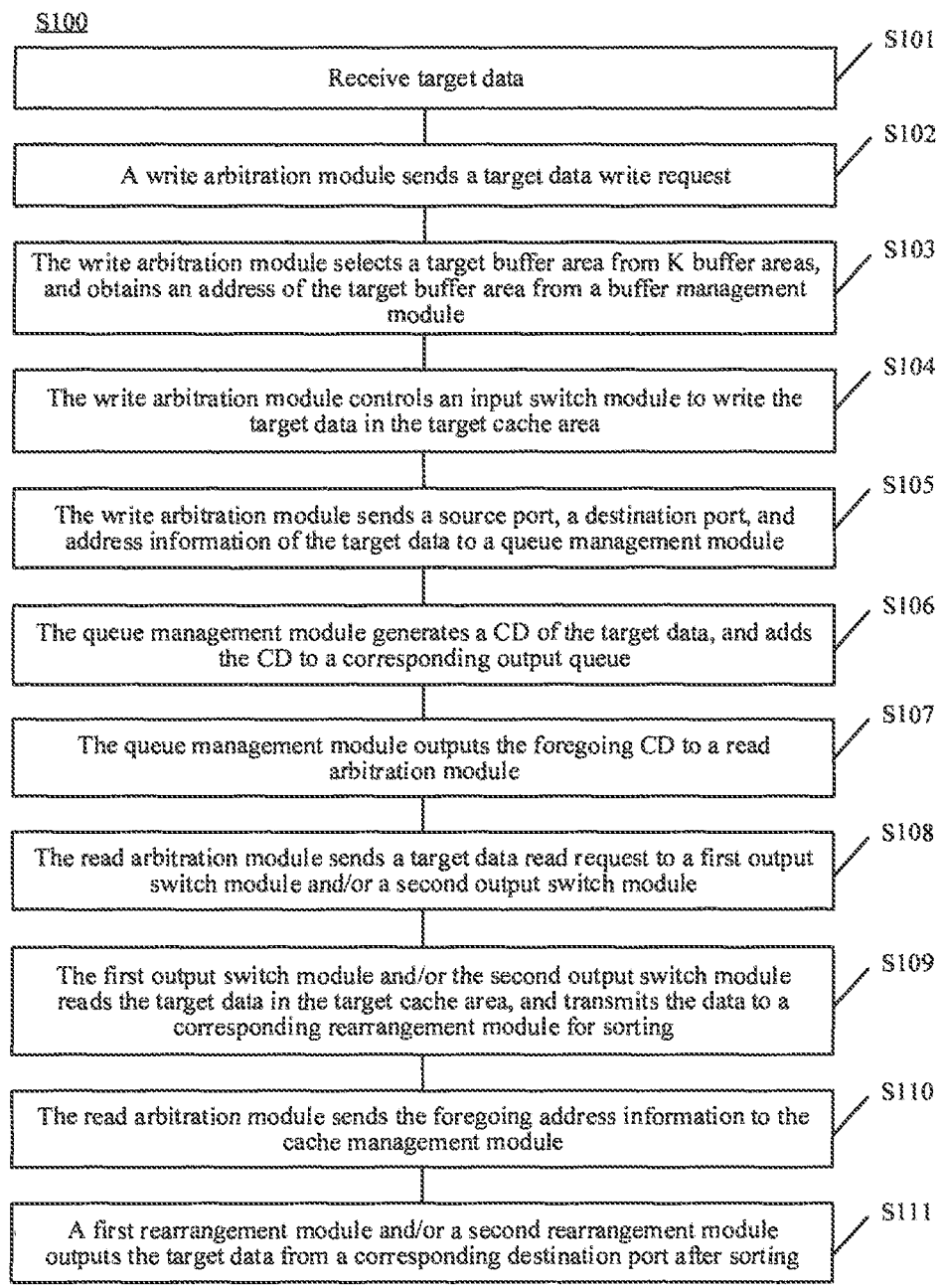
FIG. 5 is a schematic flowchart of a data processing method according to an embodiment of this application.

FIG. 5 is a schematic flowchart of a data processing method S100 according to an embodiment of this application. The method S100 may be performed, for example, by the data processing apparatus provided in the embodiments of this application.

Step S101: Receive target data.

Step S102: A write arbitration module sends a target data write request.

Step S103: The write arbitration module selects a target buffer area from K buffer areas, and obtains an address of the target buffer area from a buffer management module.

Step S104: The write arbitration module controls an input switch module to write the target data in the target buffer area.

Step S105: The write arbitration module sends a source port, a destination port, and address information of the target data to a queue management module.

Step S106: The queue management module generates a CD of the target data, and adds the CD to a corresponding output queue.

Step S107: The queue management module outputs the foregoing CD to a read arbitration module.

Step S108: The read arbitration module sends a target data read request to a first output switch module and/or a second output switch module.

Step S109: The first output switch module and/or the second output switch module reads the target data in the target buffer area, and transmits the data to a corresponding rearrangement module for sorting.

Step S110: The read arbitration module sends the foregoing address information to the buffer management module.

Step S111: A first rearrangement module and/or a second rearrangement module outputs the target data from a corresponding destination port after sorting.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data processing apparatus, comprising:
   N apparatus input ends, wherein N is an integer greater than one;
   an input switch configured to obtain data from the N apparatus input ends, wherein N input ends of the input switch are coupled to the N apparatus input ends in a one to one manner;
   K buffer areas, wherein K output ends of the input switch are coupled to inputs of the K buffer areas, wherein the K buffer areas comprise a first group of areas and a second group of areas, wherein buffer areas in the first group of areas do not overlap with buffer areas in the second group of areas;
   a first output switch configured to read data only from the first group of areas;
   a second output switch configured to read data only from the second group of areas;
   M apparatus output ends, wherein M is an integer greater than one, wherein M output ends of the first output switch is coupled to the M apparatus output ends in the one to one manner, and wherein M output ends of the second output switch is coupled to the M apparatus output ends in the one to one manner;
   a write arbitration circuit configured to control the input switch to evenly store the data in the K buffer areas, wherein a control end of the write arbitration circuit is coupled to a control end of the input switch; and
   a read arbitration circuit, wherein a first control end of the read arbitration circuit is coupled to a control end of the first output switch, wherein a second control end of the read arbitration circuit is coupled to a control end of the second output switch, and wherein the read arbitration circuit is configured to:
      control the first output switch to read data from the first group of areas;
      control the second output switch to read data from the second group of areas; and
      control the first output switch and the second output switch to separately transmit the read data to the M apparatus output ends.

2. The data processing apparatus of claim 1, further comprising a buffer management circuit, wherein a first address end of the buffer management circuit is coupled to a first address end of the read arbitration circuit, wherein a second address end of the buffer management circuit is coupled to a first address end of the write arbitration circuit, wherein the write arbitration circuit is further configured to:
   obtain an address of a first buffer area in the K buffer areas from the buffer management circuit; and
   control the input switch to store obtained first data in the first buffer area, and
   wherein the read arbitration circuit is further configured to:
      control the first output switch to read second data stored at an address of a second buffer area in the first group of areas;
      send the address of the second buffer area to the buffer management circuit; and
      transmit the second data to a first apparatus output end in the M apparatus output ends, the first apparatus output end comprising a destination port of the second data.

3. The data processing apparatus of claim 2, wherein the first buffer area is the same as the second buffer area, wherein the first buffer area comprises a plurality of single-port buffer units, wherein the write arbitration circuit is further configured to:
   obtain, from the buffer management circuit, an address of a first buffer unit in the buffer units comprised in the first buffer area; and
   control the input switch to store the first data at the address of the first buffer unit, and
   wherein the read arbitration circuit is further configured to:
      control the first output switch to read the second data stored at an address of a second buffer unit in the buffer units except the first buffer unit;
      send the address of the second buffer unit to the buffer management circuit; and
      transmit the second data to the first apparatus output end.

4. The data processing apparatus of claim 3, wherein a priority of storing data by the write arbitration circuit is higher than a priority of reading data by the read arbitration circuit, wherein the write arbitration circuit is further configured to:
   collect statistics about a data storage status of each of the buffer units;
   set, according to the data storage status of each of the buffer units, a buffer unit whose stored-data volume is less than a first threshold in the buffer units as the first buffer unit; and send, to the buffer management circuit, first request information requesting the address of the first buffer unit, wherein the buffer management circuit is configured to send a write address of the first buffer unit to the write arbitration circuit according to the first request information, wherein the write address of the first buffer unit comprises an address of idle storage space in the first buffer unit, and wherein the write arbitration circuit is further configured to:
obtain the write address from the buffer management circuit; and
control the input switch to store the first data at the write address.

5. The data processing apparatus of claim 4, wherein a feedback end of the write arbitration circuit is coupled to a feedback end of the read arbitration circuit, wherein the write arbitration circuit is further configured to send, to the read arbitration circuit, first feedback information indicating that the first buffer unit is currently storing data, and wherein the read arbitration circuit is further configured to:
set, according to the first feedback information, a buffer unit whose stored-data volume is greater than a second threshold in the buffer units except the first buffer unit as the second buffer unit;
control the first output switch to read the second data stored in the second buffer unit;
send the address of the second buffer unit to the buffer management circuit; and
transmit the second data to the first apparatus output end.

6. The data processing apparatus of claim 3, wherein a priority of reading data by the read arbitration circuit is higher than a priority of storing data by the write arbitration circuit, wherein the read arbitration circuit is configured to:
collect statistics about a data storage status of each of the buffer units;
set, according to the data storage status of each of the buffer units, a buffer unit whose stored-data volume is greater than a third threshold in the buffer units as the second buffer unit; and
send, to the buffer management circuit, second request information requesting the address of the second buffer unit, wherein the buffer management circuit is configured to send a read address of the second buffer unit to the read arbitration circuit according to the second request information, wherein the read address of the second buffer unit is an address of storage space in which the second data is stored in the second buffer unit, and wherein the read arbitration circuit is further configured to:
obtain the read address from the buffer management circuit; and
control the first output switch to read the second data from the read address.

7. The data processing apparatus of claim 6, wherein a feedback end of the write arbitration circuit is coupled to a feedback end of the read arbitration circuit, wherein the read arbitration circuit is further configured to send, to the write arbitration circuit, second feedback information indicating that the second buffer unit is currently reading data, and wherein the write arbitration circuit is further configured to:
set, according to the second feedback information, a buffer unit whose stored-data volume is less than a fourth threshold in the buffer units except the second buffer unit as the first buffer unit; and
control the input switch to store the first data at the address of the first buffer unit.

8. The data processing apparatus of claim 3, wherein the read arbitration circuit is further configured to:
control the second output switch to read third data stored in a third buffer area in the second group of areas;
transmit the third data to a second apparatus output end in the M apparatus output ends; and
send an address of the third buffer area to the buffer management circuit, and
the second apparatus output end comprising a destination port of the third data.

9. The data processing apparatus of claim 1, further comprising a first rearrangement circuit and a second rearrangement circuit, wherein the M output ends of the first output switch are coupled to M input ends of the first rearrangement circuit, wherein the M output ends of the second output switch are coupled to M input ends of the second rearrangement circuit, wherein M output ends of the first rearrangement circuit are coupled to the M apparatus output ends, wherein M output ends of the second rearrangement circuit are coupled to the M apparatus output ends, and wherein the read arbitration circuit is further configured to:
control the first output switch to transmit the read data to the first rearrangement circuit; and
control the second output switch to transmit the read data to the second rearrangement circuit,
wherein the first rearrangement circuit is configured to:
obtain the data from the first output switch;
sort the data from the first output switch with a same destination port when there are a plurality of data pieces with the same destination port; and
transmit the data from the first output switch to a corresponding apparatus output end according to a first sorting result, and
wherein the second rearrangement circuit is configured to:
obtain the data read from the second output switch;
sort the data read from the second output switch with a same destination port when there are a plurality of data pieces with the same destination port; and
transmit the data read from the second output switch to a corresponding apparatus output end according to a second sorting result.

10. The data processing apparatus of claim 2, further comprising a queue management circuit, wherein a first address end of the queue management circuit is coupled to a second address end of the write arbitration circuit, wherein a second address end of the queue management circuit is coupled to a second address end of the read arbitration circuit, wherein the queue management circuit is configured to:
obtain data information from the write arbitration circuit, wherein the data information comprises a source port, a destination port, and a storage address for storing the data that are of data obtained by the write arbitration circuit;
generate a cell descriptor (CD) according to the data information;
add the CD to an output queue; and
output the CD to the read arbitration circuit using the output queue, wherein a source port of the output queue comprises the source port of the data, wherein a destination port of the output queue comprises the destination port of the data, wherein the N apparatus input ends comprise the source port of the data, wherein the M apparatus output ends comprise the destination port of the data, and wherein the read arbitration circuit is configured to:
obtain the CD from the queue management circuit;
control, according to the CD, an output switch to read the data stored at the storage address;
send the storage address to the buffer management circuit; and
control the output switch corresponding to the storage address to output the data to the destination port of the data.

11. The data processing apparatus of claim 1, further comprising a buffer management circuit, wherein a first address end of the buffer management circuit is coupled to a first address end of the read arbitration circuit, and wherein a second address end of the buffer management circuit is coupled to a first address end of the write arbitration circuit.

12. An apparatus, comprising:
N input ends;
an input switch configured to obtain data from the N apparatus input ends, wherein N input ends of the input switch are coupled to the N input ends in a one to one manner;
K buffer areas, wherein K output ends of the input switch are coupled to inputs of the K buffer areas, wherein the K buffer areas comprise a first group of areas and a second group of areas, wherein buffer areas in the first group of areas do not overlap with buffer areas in the second group of areas;
a first output switch configured to read data only from the first group of areas;
a second output switch configured to read data only from the second group of areas;
M apparatus output ends, wherein M is an integer greater than one, wherein M output ends of the first output switch is coupled to the M apparatus output ends in the one to one manner, and wherein M output ends of the second output switch is coupled to the M apparatus output ends in the one to one manner;
a write arbitration circuit control the input switch to evenly store the data in the K buffer areas, wherein a control end of the write arbitration circuit is coupled to a control end of the input switch; and
a read arbitration circuit, wherein a first control end of the read arbitration circuit is coupled to a control end of the first output switch, wherein a second control end of the read arbitration circuit is coupled to a control end of the second output switch, and wherein the read arbitration circuit is configured to:
control the first output switch to read data from the first group of areas;
control the second output switch to read data from the second group of areas; and
control the first output switch and the second output switch to separately transmit the read data to the M apparatus output ends.

13. The apparatus of claim 12, further comprising a buffer management circuit, wherein a first address end of the buffer management circuit is coupled to a first address end of the read arbitration circuit, wherein a second address end of the buffer management circuit is coupled to a first address end of the write arbitration circuit, wherein the write arbitration circuit is further configured to:
obtain an address of a first buffer area in the K buffer areas from the buffer management circuit; and control the input switch to store obtained first data in the first buffer area, and
wherein the read arbitration circuit is further configured to:
control the first output switch to read second data stored at an address of a second buffer area in the first group of areas;
send the address of the second buffer area to the buffer management circuit; and
transmit the second data to a first apparatus output end in the M apparatus output ends, the first apparatus output end comprising a destination port of the second data.

14. The apparatus of claim 13, wherein the first buffer area is the same as the second buffer area, wherein the first buffer area comprises a plurality of single-port buffer units, wherein the write arbitration circuit is further configured to:
obtain, from the buffer management circuit, an address of a first buffer unit in the buffer units comprised in the first buffer area; and
control the input switch to store the first data at the address of the first buffer unit, and
wherein the read arbitration circuit is further configured to:
control the first output switch to read the second data stored at an address of a second buffer unit in the buffer units except the first buffer unit;
send the address of the second buffer unit to the buffer management circuit; and
transmit the second data to the first apparatus output end.

15. The apparatus of claim 14, wherein a priority of storing data by the write arbitration circuit is higher than a priority of reading data by the read arbitration circuit, wherein the write arbitration circuit is further configured to:
collect statistics about a data storage status of each of the buffer units;
set, according to the data storage status of each of the buffer units, a buffer unit whose stored-data volume is less than a first threshold in the buffer units as the first buffer unit; and
send, to the buffer management circuit, first request information requesting the address of the first buffer unit,
wherein the buffer management circuit is configured to send a write address of the first buffer unit to the write arbitration circuit according to the first request information,
wherein the write address of the first buffer unit comprises an address of idle storage space in the first buffer unit, and
wherein the write arbitration circuit is further configured to:
obtain the write address from the buffer management circuit; and
control the input switch to store the first data at the write address.

16. The apparatus of claim 14, wherein a feedback end of the write arbitration circuit is coupled to a feedback end of the read arbitration circuit, wherein the write arbitration circuit is further configured to send, to the read arbitration circuit, first feedback information indicating that the first buffer unit is currently storing data, and wherein the read arbitration circuit is further configured to:

set, according to the first feedback information, a buffer unit whose stored-data volume is greater than a second threshold in the buffer units except the first buffer unit as the second buffer unit;

control the first output switch to read the second data stored in the second buffer unit;

send the address of the second buffer unit to the buffer management circuit; and transmit the second data to the first apparatus output end.

17. The apparatus of claim 15, wherein a priority of reading data by the read arbitration circuit is higher than a priority of storing data by the write arbitration circuit, wherein the read arbitration circuit is configured to:

collect statistics about a data storage status of each of the buffer units;

set, according to the data storage status of each of the buffer units, a buffer unit whose stored-data volume is greater than a third threshold in the buffer units as the second buffer unit; and send, to the buffer management circuit, second request information requesting the address of the second buffer unit, wherein the buffer management circuit is configured to send a read address of the second buffer unit to the read arbitration circuit according to the second request information, wherein the read address of the second buffer unit is an address of storage space in which the second data is stored in the second buffer unit, and wherein the read arbitration circuit is further configured to:

obtain the read address from the buffer management circuit; and control the first output switch to read the second data from the read address.

18. The apparatus of claim 17, wherein a feedback end of the write arbitration circuit is coupled to a feedback end of the read arbitration circuit, wherein the read arbitration circuit is further configured to send, to the write arbitration circuit, second feedback information indicating that the second buffer unit is currently reading data, and wherein the write arbitration circuit being further configured to:

set, according to the second feedback information, a buffer unit whose stored-data volume is less than a fourth threshold in the buffer units except the second buffer unit as the first buffer unit; and control the input switch to store the first data at the address of the first buffer unit.

19. The apparatus of claim 14, wherein the read arbitration circuit is further configured to:

control the second output switch to read third data stored in a third buffer area in the second group of areas;

transmit the third data to a second apparatus output end in the M apparatus output ends; and send an address of the third buffer area to the buffer management circuit, and the second apparatus output end comprising a destination port of the third data.

20. The apparatus of claim 12, wherein a feedback end of the write arbitration circuit is coupled to a feedback end of the read arbitration circuit.

* * * * *